United States Patent
Graf

(10) Patent No.: US 8,915,127 B2
(45) Date of Patent: Dec. 23, 2014

(54) METHOD AND APPARATUS FOR DIAGNOSING A COOLANT PUMP FOR AN INTERNAL COMBUSTION ENGINE

(75) Inventor: Johann Graf, Hausen (DE)

(73) Assignee: Audi AG, Ingolstadt (DE)

( * ) Notice: Subject to any disclaimer, the term of this patent is extended or adjusted under 35 U.S.C. 154(b) by 2 days.

(21) Appl. No.: 13/818,530

(22) PCT Filed: Jul. 22, 2011

(86) PCT No.: PCT/EP2011/003672
§ 371 (c)(1),
(2), (4) Date: Feb. 22, 2013

(87) PCT Pub. No.: WO2012/025178
PCT Pub. Date: Mar. 1, 2012

(65) Prior Publication Data
US 2013/0156065 A1  Jun. 20, 2013

(30) Foreign Application Priority Data
Aug. 25, 2010 (DE) .......... 10 2010 035 366

(51) Int. Cl.
| | | |
|---|---|---|
| *G01M 15/04* | (2006.01) | |
| *F01P 5/14* | (2006.01) | |
| *F01P 7/16* | (2006.01) | |
| *F01P 5/12* | (2006.01) | |
| *F01P 11/16* | (2006.01) | |

(52) U.S. Cl.
CPC .......... *G01M 15/04* (2013.01); *F01P 5/14* (2013.01); *F01P 2005/125* (2013.01); *F01P 11/16* (2013.01); *F01P 7/162* (2013.01); *F01P 2031/36* (2013.01); *F01P 2025/33* (2013.01)
USPC ..................................... 73/114.68

(58) Field of Classification Search
CPC ... F01P 11/16; F01P 2025/08; F01P 2025/33; F01P 2025/31; F01P 2003/024; F01P 2003/021; F01P 2025/46; G01M 15/048; G01M 15/04
USPC ......................................... 73/114.68
See application file for complete search history.

(56) References Cited

U.S. PATENT DOCUMENTS

| | | |
|---|---|---|
| 6,321,695 B1 | 11/2001 | Yoo et al. |
| 6,390,081 B1 * | 5/2002 | Novak et al. .................. 123/676 |

(Continued)

FOREIGN PATENT DOCUMENTS

| | | |
|---|---|---|
| DE | 44 26 494 | 2/2007 |
| DE | 102006057801 | 6/2008 |

(Continued)

OTHER PUBLICATIONS

International Search Report issued by the European Patent Office in International Application PCT/EP2011/003672.

*Primary Examiner* — Freddie Kirkland, III
(74) *Attorney, Agent, or Firm* — Henry M. Feiereisen LLC

(57) ABSTRACT

In a method and a device for diagnosing a switchable coolant pump for circulating a coolant in a coolant circuit of an internal combustion engine, an actual value of the cylinder head temperature of the internal combustion engine is measured and the actual value of the cylinder head temperature is compared with a model value of the cylinder head temperature. The functionality of the coolant pump is assessed according to the comparison result.

11 Claims, 2 Drawing Sheets

(56) References Cited

U.S. PATENT DOCUMENTS

| | | | |
|---|---|---|---|
| 7,047,799 B2 * | 5/2006 | Wakahara et al. | 73/114.68 |
| 7,168,399 B2 * | 1/2007 | Wakahara | 123/41.15 |
| 7,743,651 B2 * | 6/2010 | Wakahara et al. | 73/114.68 |
| 8,224,517 B2 * | 7/2012 | Eser et al. | 701/31.4 |
| 2002/0195068 A1 | 12/2002 | Ichinose et al. | |
| 2007/0175415 A1 | 8/2007 | Rizoulis et al. | |
| 2011/0098883 A1 * | 4/2011 | Eser et al. | 701/35 |

FOREIGN PATENT DOCUMENTS

| | | |
|---|---|---|
| DE | 102008032130 | 1/2010 |
| WO | WO 99/15769 | 4/1999 |
| WO | WO 2010003754 A1 * | 1/2010 |

* cited by examiner

METHOD AND APPARATUS FOR DIAGNOSING A COOLANT PUMP FOR AN INTERNAL COMBUSTION ENGINE

CROSS-REFERENCES TO RELATED APPLICATIONS

This application is the U.S. National Stage of International Application No. PCT/EP2011/003672, filed Jul. 22, 2011, which designated the United States and has been published as International Publication No. WO 2012/025178 and which claims the priority of German Patent Application, Ser. No. 10 2010 035 366.3, filed Aug. 25, 2010, pursuant to 35 U.S.C. 119(a)-(d).

BACKGROUND OF THE INVENTION

The invention relates to a method and an apparatus for diagnosing a coolant pump that can be switched independent of the operating condition of an internal combustion engine for circulating a coolant in a coolant circuit of the internal combustion engine.

Such methods and apparatuses are used to check the operation of a switchable coolant pump for faulty switching and to avoid damage to the coolant circuit and/or the internal combustion engine resulting therefrom. Switchable coolant pumps are used to implement an innovative thermal management (ITM) in cooling circuits of internal combustion engines, in particular to improve the heat-up of the engine following a cold start. Electrically drivable coolant pumps, coolant pumps that can be disconnected from a mechanical belt drive or potted coolant pumps may be used as switchable coolant pumps. With potted coolant pumps, a pot is placed over the impeller of the coolant pump, preferably controlled by a vacuum or hydraulically, allowing the coolant flow to be regulated.

DE 10 2008 032 130 A1 discloses a generic method for diagnosing a coolant pump that can be switched on and off regardless of the operating state of an internal combustion engine for circulating a coolant in a closed-loop coolant circuit of the internal combustion engine, wherein at a predetermined time after a detected cold start of the internal combustion engine, both a value representing a coolant temperature (TCO) of the combustion engine and a value representing the cylinder head temperature (CHT) of the internal combustion engine are determined, which are thereafter compared with each other. The functionality of the coolant pump is assessed depending on the result of the comparison. Disadvantageously, the compared values of coolant temperature and cylinder head temperature may be in a very wide load-dependent tolerance range, thus increasing the risk for misdiagnoses. For example, the temperature measured on the cylinder head increases disproportionately when the load is suddenly increased, whereas the coolant temperature at the outlet of the internal combustion engine adjusts only after a time delay. Such misdiagnoses can cause uncertainty for the operator of the internal combustion engine and unnecessary maintenance work on the coolant circuit.

SUMMARY OF THE INVENTION

It is therefore an object of the present invention to provide a method and an apparatus for diagnosing a coolant pump for an internal combustion engine with a reduced susceptibility to misdiagnoses.

According to one aspect of the invention, in a method for diagnosing a switchable coolant pump for circulating a coolant in a coolant circuit of an internal combustion engine, an actual value of the cylinder head temperature of the internal combustion engine is measured and the actual value of the cylinder head temperature is compared with a model value of the cylinder head temperature, which is computed from an actual value of the coolant temperature of the internal combustion engine and at least one operating variable of the internal combustion engine, and the functionality of the coolant pump is assessed depending on the comparison result.

By comparing the actual value of the cylinder head temperature with a stored and/or calculated specific model value of the cylinder head temperature, a reliable assessment of the efficiency of the coolant pump can be made in spite of the rapidly changing operating conditions of the internal combustion engine, because no direct comparison with other, possibly delayed actual values of the temperature of other components must be carried out. The model value of the cylinder head temperature may be stored in a database in the form of several characteristic curves, from which the appropriate curve is selected based on the operating state of the internal combustion engine. Alternatively, the model value of the cylinder head temperature can always be calculated anew.

In a preferred embodiment of the method, the model value of the cylinder head temperature is calculated from an actual value of the coolant temperature of the internal combustion engine and at least one operating variable of the internal combustion engine. When the actual value of the coolant temperature is corrected by the value of at least one operating variable of the internal combustion engine, a model value of the cylinder head temperature can be generated which corresponds comparatively exactly to the actual value of the cylinder head temperature when the respective operating variable of the internal combustion engine is present. This can enable a quick response to a changing operating state of the internal combustion engine, which is represented by the operating variable of the internal combustion engine, thereby significantly reducing the error rate of the diagnosis.

In a preferred embodiment of the method, the operating variable of the internal combustion engine corresponds to an actual value of the power of the internal combustion engine. The actual value of the power of the internal combustion engine is calculated from the product of the angular velocity and the load of the internal combustion engine. The angular velocity is a function of the rotation speed of the internal combustion engine, while the load is represented by the torque supplied by the internal combustion engine.

In a preferred embodiment the method, the model value of the cylinder head temperature is filtered depending on the actual value of the cylinder head temperature. Filtering additionally renders the value of the cylinder head temperature more precise. Preferably, no filter is applied at low actual values of the cylinder head temperature, whereas a filter constant may be applied at high actual values of the cylinder head temperature.

In a preferred embodiment of the method, the coolant pump is assessed to be faulty when the comparison result is outside a tolerance band. Minor deviations between the actual value and the model value of cylinder head temperature are compensated by a tolerance band, thereby further reducing the error rate of the diagnosis.

In a preferred embodiment of the method, a frequency counter counts the number of comparison results outside the tolerance band, and the coolant pump is only assessed to be faulty when the number exceeds a predetermined frequency. A one-time occurrence of a comparison result outside the tolerance band may be due to measurement errors or transient technical problems. To prevent these results from causing false diagnoses, the comparison results outside the tolerance band are counted by a frequency counter and the coolant pump is assessed to be faulty only when a certain number of exceedances are detected (within a specified time period).

In a preferred embodiment of the method, the method is started only when the coolant pump is switched on. The coolant circuit needs generally only be monitored when the previously switched-off coolant pump should be switched on again because the internal combustion engine has sufficiently heated up. The method is thus in a standby mode when the coolant pump is switched off and is only active for a specified time when the coolant pump is switched on. To prevent a thermal shock to the components of the coolant circuit, the coolant pump is intermittently switched on and off before it is operated in a state where it is permanently switched on. Preferably, the end of this intermittent operation should be awaited before the method is started.

According to another aspect of the invention, an apparatus according to the invention for the diagnosing a switchable coolant pump for circulating a coolant in a coolant circuit of an internal combustion engine has a first temperature sensor which measures an actual value of the cylinder head temperature of the internal combustion engine, wherein the actual value of the cylinder head temperature is compared in an evaluation device with a model value of the cylinder head temperature that is computed from an actual value of the coolant temperature of the internal combustion engine measured with a second temperature sensor and at least one operating variable of the internal combustion engine determined with an engine management unit, and the functionality of the coolant pump is assessed based on the comparison result.

A switchable coolant pump can be switched on and off, as necessary, in order to support the thermal management of the internal combustion engine. The coolant pump which is usually designed as a centrifugal pump may include a switchable electric drive or a separating clutch or may be constructed as a potted coolant pump. In a preferred embodiment, the potted coolant pump can be controlled by a vacuum-controlled pot that can be moved over the pump impeller. By comparing the actual value determined by the first temperature sensor of the cylinder head temperature with the model value of the cylinder head temperature, the assessment of the functionality is not affected by rapidly changing operating conditions of the internal combustion engine. For this purpose, a variety of specific values of the model cylinder head temperature may be stored in a database with characteristic curves which the evaluation device can use for comparison on a case-by-case basis. Alternatively, a model value of the cylinder head temperature can be calculated by the evaluation device depending on the particular situation.

In a preferred embodiment of the apparatus, the model value of the cylinder head temperature is calculated from an actual value of the coolant temperature of the internal combustion engine measured with a second temperature sensor and at least one operating variable of the internal combustion engine measured by an engine management unit. A rapid change in the operating state of the internal combustion engine is registered particularly fast by the first temperature sensor on the cylinder head, because the combustion of the fuel the takes place in the cylinder head. Since the second temperature sensor measures the actual value of the coolant temperature and computes therefrom, in conjunction with the operating variable of the internal combustion engine provided by the engine management unit, the model value of the cylinder head temperature, the response of the second temperature sensor, which is arranged outside the internal combustion engine and delayed compared to the first temperature sensor, can be compensated. This produces a particularly reliable model value of the cylinder head temperature. A suitable operating variable of the internal combustion engine is, in particular, the instantaneous power output, which the engine management unit can calculate from the product of the angular velocity and the load of the internal combustion engine.

In a preferred embodiment of the apparatus, the first temperature sensor is arranged in a wall of the cylinder head and the second temperature sensor is arranged in a coolant flow. The first temperature sensor thus has no direct contact with the coolant in the cylinder head, but measures the coolant temperature indirectly via the temperature of the cylinder head material. The second temperature sensor is disposed in the coolant flow near the internal combustion engine and directly measures the temperature of the coolant flowing out of the internal combustion engine.

In a preferred embodiment of the apparatus, the coolant pump is assessed by the evaluation device to be faulty, when a frequency counter counts a number of comparison results outside a tolerance band with a frequency greater than a predetermined frequency. The diagnosis can be made significantly more reliable by counting the comparison results outside a tolerance band with a frequency counter and by assessing the coolant pump to be faulty only when the number of counts exceeds a predetermined frequency.

In a preferred embodiment of the apparatus, a warning device issues a warning message when the coolant pump is assessed to be faulty by the evaluation device. The warning message issued by the warning device is intended to notify the operator of the internal combustion engine of the fault of the coolant pump, thereby allowing the operator to initiate countermeasures.

In a preferred embodiment of the apparatus, the evaluation device, the engine management unit and the coolant pump controller are components of a control unit for the internal combustion engine. The control unit is primarily used for controlling and/or regulating the internal combustion engine, in particular the air and fuel supply.

BRIEF DESCRIPTION OF THE DRAWING

Further details, advantages and features of the invention will become apparent from the following description of a preferred embodiment with reference to the drawings.

In the drawings.

DETAILED DESCRIPTION OF PREFERRED EMBODIMENTS

Figure 1:
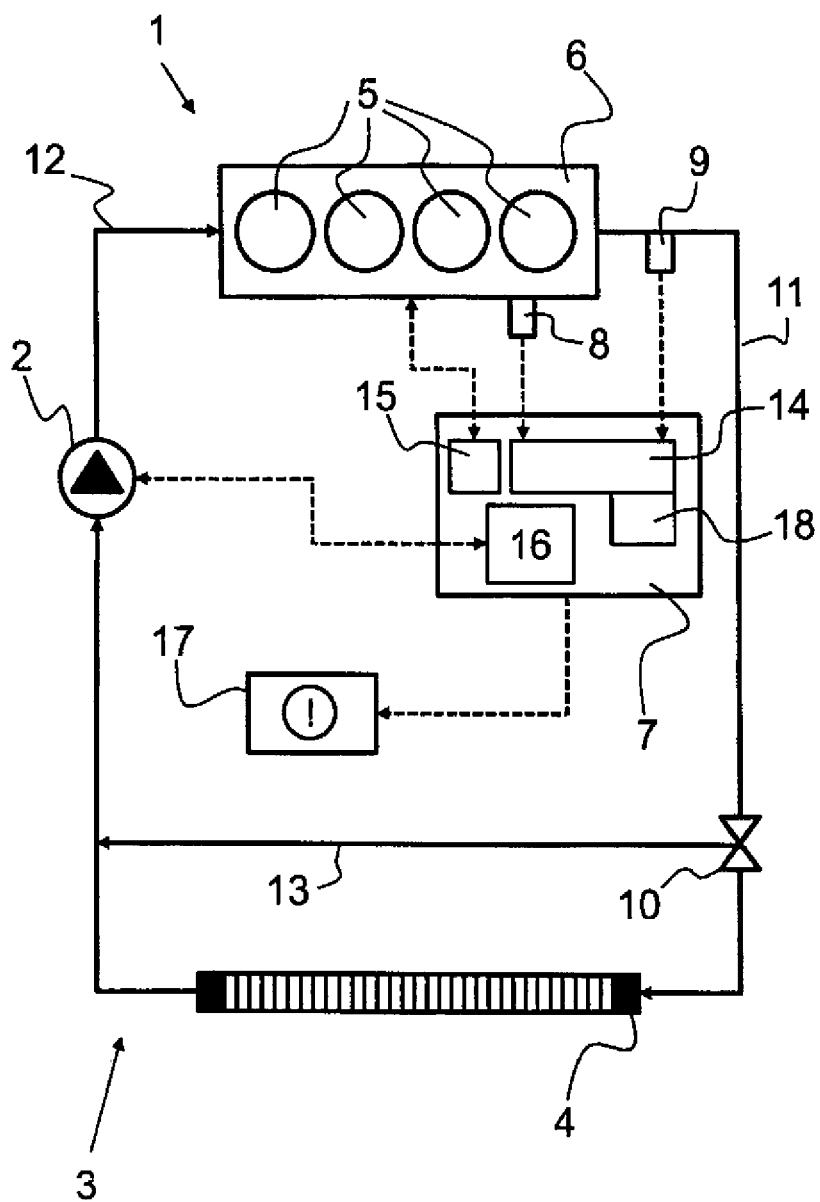
FIG. 1 shows in a schematic view a refrigerant circuit with an apparatus according to the present invention.

According to FIG. 1, a coolant circuit 3 for an internal combustion engine 1 includes a heat exchanger 4 and a coolant pump 2 that can be switched on and off for circulating the coolant between the internal combustion engine 1 and the heat exchanger 4. The internal combustion engine 1 is in the present example reduced to a cylinder head 6 with four cylinders 5 in which the combustion of the supplied fuel takes place. The cylinder head 6 is penetrated by unillustrated cavities, which are filled with the coolant for transferring the heat from the combustion process. The coolant is transported from the internal combustion engine 1 to the heat exchanger 4 via a coolant flow 11 for re-cooling in the heat exchanger 4 by the ambient air. A coolant return line 12 returns from the heat exchanger 4 to the internal combustion engine 1. The coolant pump 2, constructed here as a potted centrifugal pump, produces, when switched on, the flow needed for the coolant circulation. The heat exchanger 4 can be bypassed via a bypass 13 by actuating a control valve 10. A first temperature sensor (THd) 8, which has no direct contact with the coolant in the cylinder head 6, is arranged in a wall of the cylinder head 6, measuring the material temperature of the cylinder head 6. A second temperature sensor (TCO) 9, which is in direct contact with the coolant in the coolant supply 11 and measures the temperature of the coolant flowing out of the cylinder head 6, is arranged in the coolant flow 11 near the cylinder head 6. A control unit 7 for the internal combustion engine 1 includes an evaluation device 14, an engine management unit 15, a coolant pump controller 16 and a frequency counter 18. Signals from the first 8 and second temperature sensor 9 are supplied to the evaluation device 14. The engine management unit 15 exchanges signals, for example relating to the rotation speed and load, with the components of the internal combustion engine 1. The coolant pump 2 is switched on and off by the coolant pump controller 16. The frequency counter 18 counts specific events in the evaluation device 14. The control unit 7 may initiate a warning message to a warning device 17, when a malfunction of the coolant pump 2 has been detected.

Figure 2:
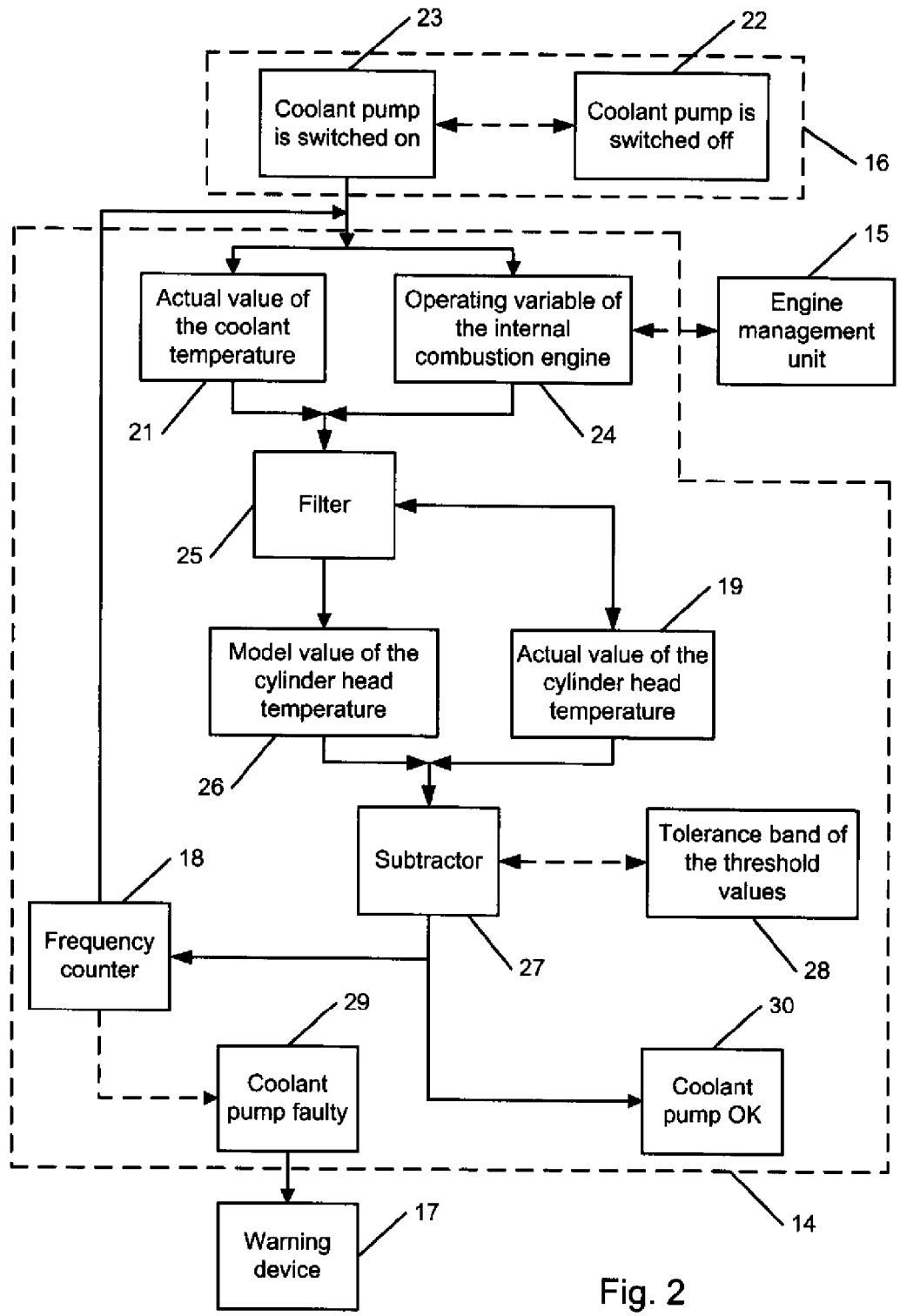
FIG. 2 shows a flow diagram of a method according to the present invention.

FIG. 2 shows a possible schematic flow diagram of a method according to the invention for diagnosing a coolant pump 2 of an internal combustion engine 1 shown in FIG. 1. The method is started in response to the operating state of the coolant pump 2 determined by the coolant pump controller 16. When the coolant pump 2 was switched off (22), the process is not started. Conversely, when the coolant pump 2 was switched on again (23) from the switched-off state (22), the method is started by querying with an engine management unit 15 the actual value of the coolant temperature 21 from a second temperature sensor 9 and an operating variable of the internal combustion engine 24, in the present example the actual value of the power of the internal combustion engine 1. The actual value of coolant temperature 21 and the actual value of the power 24 produce a model value of the cylinder head temperature 26 stored in the evaluation device 14, which however is filtered in an intermediate step depending on the actual value of the cylinder head temperature 19. No filtering takes place at low cylinder head temperatures 19, whereas the model value of the cylinder head temperature 26 is corrected with a filter constant at high cylinder head temperatures 19. The filtered model value of the cylinder head temperature 26 and the actual value of the cylinder head temperature 19 are subtracted from each other in a subtractor 27, and an absolute value is formed. The comparison result from the subtractor 27 is compared with a tolerance range of the threshold values 28. When the comparison result from the subtractor 27 is within the tolerance band of the threshold values 28, the coolant pump 2 is considered to be functional (30) and the process is terminated. When the comparison result from the subtractor 27 is outside the tolerance band of the threshold values 28, the process is restarted beginning with the measurement of the actual values of the coolant temperature 21 and the power of the internal combustion engine 24, and the frequency counter 18 is incremented by one. When the frequency counter 18 has counted a certain number of occurrences within a given period of time where the comparison result is exceeded, the coolant pump 2 is considered to be faulty (29) and a warning message is initiated to the operator of the internal combustion engine 2 by the warning device 17.

The invention claimed is:

1. A method for diagnosing a switchable coolant pump for circulating a coolant in a coolant circuit of an internal combustion engine, comprising:
   measuring an actual value of a cylinder head temperature of the internal combustion engine,
   measuring an actual value of a coolant temperature of the internal combustion engine,
   comparing the actual value of the cylinder head temperature with a model value of the cylinder head temperature which is computed from the actual value of the coolant temperature of the internal combustion engine and from at least one operating variable of the internal combustion engine, and
   assessing the functionality of the coolant pump based on a result of the comparison.

2. The method of claim 1, wherein the at least one operating variable of the internal combustion engine corresponds to an actual value of a power of the internal combustion engine.

3. The method of claim 1, and further comprising filtering the model value of the cylinder head temperature depending on the actual value of the cylinder head temperature.

4. The method of claim 1, wherein the functionality of the coolant pump is assessed to be faulty when the result of the comparison lies outside a tolerance band.

5. The method of claim 1, and further comprising:
   counting with a frequency counter a number of occurrences when the result of the comparison lies outside a tolerance band, and
   assessing the functionality of the coolant pump to be faulty only when the number of occurrences exceeds a predetermined frequency.

6. The method of claim 1, wherein the method is started only when the coolant pump is switched on.

7. An apparatus for diagnosing a switchable coolant pump for circulating a coolant in a coolant circuit of an internal combustion engine, comprising:
   a first temperature sensor for measuring an actual value of a cylinder head temperature of the internal combustion engine,
   a second temperature sensor for measuring an actual value of a coolant temperature of the internal combustion engine,
   an engine management unit measuring at least one operating variable of the internal combustion engine, and
   an evaluation device configured to compare the measured actual value of the cylinder head temperature with a model value of the cylinder head temperature that is computed from the actual value of the coolant temperature and from the at least one operating variable of the internal combustion engine, and to assess the functionality of the coolant pump based on a result of the comparison.

8. The apparatus of claim 7, wherein the first temperature sensor is arranged in a wall of a cylinder head and the second temperature sensor is arranged in a coolant inlet of the coolant flow.

9. The apparatus of claim 7, further comprising a frequency counter, wherein the evaluation device assesses the functionality of the coolant pump to be faulty when the frequency counter counts a number of occurrences of the result of the comparison lying outside a tolerance band that is higher than a predetermined frequency.

10. The apparatus of claim 7, further comprising a warning device configured to issue a warning message when the evaluation device assesses the functionality of the coolant pump to be faulty.

11. The apparatus of claim 7, wherein the evaluation device, the engine management unit and a coolant pump controller are components of a control device for the internal combustion engine.

\* \* \* \* \*